Aug. 13, 1940.    E. P. McDONALD    2,211,068
METHOD AND APPARATUS FOR CLASSIFYING SOLIDS
Filed Dec. 24, 1937    3 Sheets-Sheet 1

INVENTOR
ERNEST P. McDONALD
BY W. E. Beatty
ATTORNEY

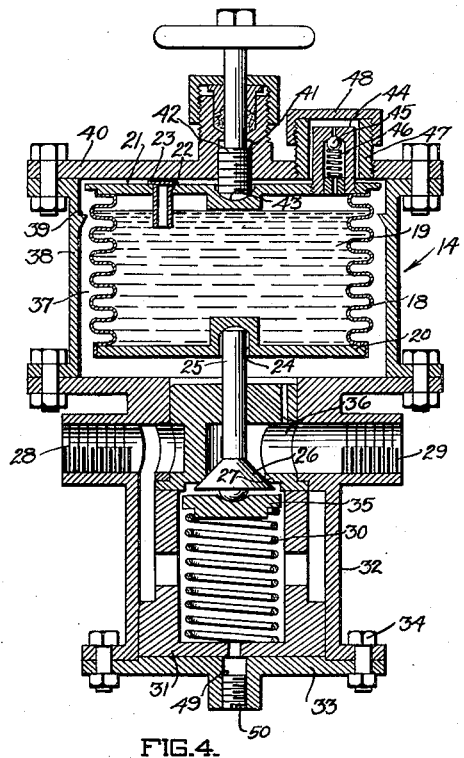

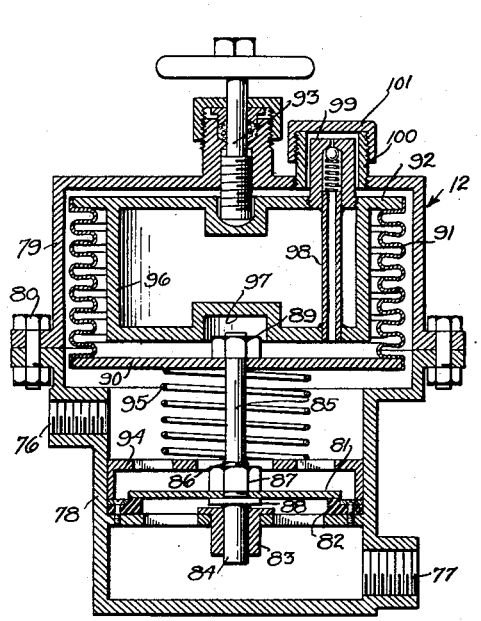

Patented Aug. 13, 1940

2,211,068

UNITED STATES PATENT OFFICE 2,211,068

METHOD AND APPARATUS FOR CLASSIFYING SOLIDS

Ernest Percy McDonald, Sacramento, Calif., assignor to Albert E. Vandercook, Sacramento, Calif.

Application December 24, 1937, Serial No. 181,671

8 Claims. (Cl. 209—455)

This invention relates to method and means for classifying solids and particularly to the hydraulic classification or separation wherein a pulsating stream of fluid such as water acts on ore pulp or the like to effect classification in accordance with the settling rate of the solid constituent of material to be classified.

An object of the invention is to obtain uniform classification and to this end I provide method and means for regulating and controlling the generation and application of impulses of water or other fluid to control the classification.

Certain features of the invention reside in obtaining uniform classification in spite of a source of water or other fluid of variable pressure in obtaining a desired range of frequency or pressure for the impulses, in generating the impulses with a self acting valve, in obtaining a range of different pressures for the same frequency of the impulses and in obtaining a series of impulses uniform in force and frequency whereby uniformity of classification is obtained.

Other features of the invention relate to improvements in certain apparatus for carrying out my invention namely, in a pressure regulator for regulating the pressure of the water supply, a tank for storing a low head of water, thus regulated, under an air cushion, with means for adjusting the pressure of the air cushion to thereby regulate the acceleration of the water entering the pulsator, a pulsator for generating the impulses of water and a hutch for subjecting the ore pulp, or the like, to the impulses of water and for collecting the concentrate.

For further details of the invention reference may be made to the drawings wherein:

Fig. 4 is a sectional elevation of one type of pressure regulator valve.

Fig. 5 is a sectional elevation of a modified type of bellows which may be used in the pressure regulator of Fig. 4.

Fig. 6 is a sectional elevation of a modified type of a flexible member which may be employed to operate the valve of the pressure regulator in Fig. 4.

Fig. 7 is a perspective view partly in section of the tensioning means which may be employed to regulate the valve of the hutch of Fig. 2. A modified and preferred form of this tensioning means is shown in the sectional elevation in Fig. 12.

Fig. 8 is a sectional elevation of a pulsator.

Fig. 9 is a sectional elevation of a modified and preferred form of pulsator.

Fig. 10 is a sectional elevation of a further modification of the pulsator of Fig. 8.

Fig. 11 is a sectional elevation of a modified and preferred form of valve for the hutch of Fig. 2.

Figure 12 is a sectional elevation of a modification.

Figure 1:
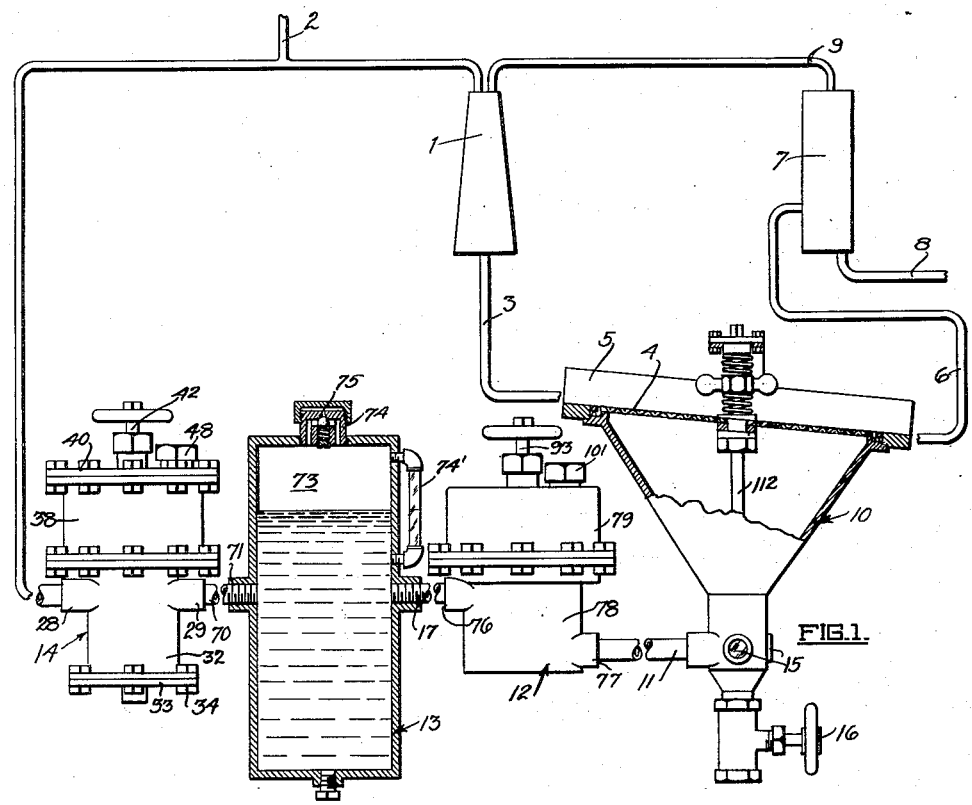
Fig. 1 is a schematic view of a classifier circuit according to the invention.

Referring in detail to the drawings, the classifier circuit in Fig. 1 comprises a ball mill 1 which is supplied with water from a pipe or other source 2. The ball mill 1 is also supplied with ground ore as is well understood, from a bin or other source not shown. The outlet from the ball mill 1 is led by way of conduit 3 to the top of an inclined screen 4. The screen 4 is arranged in the bottom of a sluice section 5. The tailings discharge from the sluice section 5 is led by way of conduit 6 to the classifier 7 which has a tailings discharge conduit 8 and also a return conduit 9 leading to the ball mill.

The sluice 5 and its screen 4 are arranged at the top of a hutch 10 in which the solid constituent of the ore pulp supplied thereto from the ball mill 1 or other source of a suspension of solids, is classified in accordance with the settling rate of the solid constituent of the ore pulp, or the like. This classification is effected agitatively by a series of unidirectional high frequency impulses of water or other fluid supplied to the hutch 10 by way of conduit 11. These high frequency impulses of fluid are generated by the pulsator 12 which is supplied with fluid from a tank 13 which in turn is supplied with fluid from a pressure regulator 14 connected to a suitable fluid source such as 2.

The hutch 10 is provided with one or more windows 15 through which the collection of concentrate may be observed, the concentrate passing downwardly from the hutch with a volume of water which can be regulated by the valve 16.

I have discovered that uniformity of operation of the hutch 10, that is to say, uniformity of classification of the solids, depends upon the uniform velocity of the fluid and the frequency of the impulses supplied to the hutch 10 by the conduit 11. Furthermore in treating different materials it is desirable to be able to change not only the frequency of the impulses and not only to maintain these impulses at a sustained or uniform force, but it is also desirable to be able to independently change the frequency or the force of these impulses as generated, and to regulate the velocity of water passing hutch valve 146. All of these desiderata are accomplished by my invention.

Generally speaking, the function of the pressure regulator 14 is to deliver from a fluid source such as 2 which is not constant in pressure, a constant pressure supply of water or other fluid. This pressure regulator 14 also constitutes a means for changing the frequency and the force of the impulses, as will be described hereafter in further detail.

The function of the storage tank 13 is to store the fluid from the regulator 14 under an air cushion in order to accelerate the delivery of fluid from tank 13 to the pulsator 12. Furthermore, I provide valve controlled inlet 74 for regulating the air volume above the liquid in tank 13 whereby to vary the head of fluid above the outlet 17 from the tank 13 whereby to control or regulate the frequency and force of the impulses generated by the pulsator 12.

Generally speaking, the function of the pulsator 12 is to generate fluid impulses due to the flow of fluid therethrough. For a given adjustment, the force of these impulses is sustained due to being generated by a substantially constant pressure acting on a substantially constant mass and head of water. The frequency thereof may be varied through a wide range, such as from 100 to 1000 or more per minute. By "high" frequency I mean frequencies in this range. For the particular ores with which I have dealt, I have used and prefer a frequency between 300 and 500 per minute. These impulses are uni-directional, that is free from a suction cycle such as obtains with certain types of well known plunger operated jigs. The pulsator 12 is provided with means to vary the frequency and concomitantly the force of the impulses.

While the circuit in Fig. 1 illustrates one manner in which my classifier may be employed, it will be apparent that it may be used in other manners, for example, for the classification of sand which may be supplied to the screen 4 from a pump, or otherwise.

The various pieces of apparatus which individually and in combination comprise my invention will now be described in detail and thereafter a more detailed description will be given of the operation of these elements separately and in combination.

The pressure regulator 14 illustrated generally in Fig. 1 and in detail in Fig. 4, is similar somewhat to the pressure regulator shown in my U. S. Patent 2,025,603 issued December 24, 1935, for "Pressure control valve." However, I have modified and improved my patented valve in certain respects.

As shown in Fig. 4 the pressure regulator comprises a bellows 18, most of the inside of which is filled with a non-volatile liquid 19, such as lubricating oil or glycerine. The bellows 18 has opposed rigid heads 20 and 21. The head 21 like my patented valve has a tube 22 mounted therein for the admission of the fluid 19 to the interior of the bellows. This tube extends below the level of the liquid 19 and the top of this tube 22 is sealed for example by the cap 23 which is soldered over the top thereof and to the top of the head 21 after the bellows is partially filled with liquid. The lower head 20 is provided with a recess 24 which receives the stem 25 of a valve 26. The valve 26 is provided with a valve seat 27, the valve 26 controlling the flow of water or other fluid from the inlet 28 to the outlet 29. The valve 26 is urged to its seat by a spring 30 mounted in a hollow spring barrel 31 which retains the valve seat 27 in its proper position in the casing 32 as shown in the drawings by reason of being retained by the cover 33 which is suitably fastened to the casing 32 by bolts or other fastening means 34. At its upper end the spring 31 bears on a spring cap 35 which in turn bears on the head of the valve 26.

The outlet 29 is provided with a passageway 36 which communicates with a bellows chamber 37 which is provided by the casing 38. The casing 38 is provided with a ridge or stop 39 against which the periphery of the upper head 21 is adapted to abut, which thereby prevents collapsing the bellows 18 an undue amount or beyond the allowable working stroke. The head 40 of the valve casing is provided with a centrally threaded aperture 41 in which is threaded stem 42 which serves as an adjustable abutment for the top bellows head 21. The lower end of stem 42 is rounded as shown and is received in a similarly shaped seat 43 in the head 21.

The pressure regulator in Fig. 4 functions in somewhat the same manner as my patented valve, namely, the passageway 36 communicates the pressure conditions in the outlet 29 to effect operation of the valve 26, this valve opening when the combined force exerted on the upper face of bellows head 20 exceeds the combined force exerted on the lower face of bellows head 20 and that due to the spring 31.

In order to make it possible to vary the gas pressure in the space above liquid 19, I have mounted in the upper head 21 a nipple 44 having a check valve 45 which is held to its seat by a spring 46. The nipple 44 has a passageway extending therethrough as shown and it is accessible from the exterior of the casing 38, by reason of the fact that it extends into a nipple 47 mounted on the casing head 40. A threaded cap 48 is fitted on the nipple 47 and seals the space between the bellows 18 and the valve casing 38 and on its removal of course permits an air pressure line to be placed in face to face contact with the upper end of nipple 44 to admit air or other gas under pressure to the interior of the bellows 18. A gauge (not shown) may be employed to determine how much pressure is admitted to the bellows 18, and obviously if too much pressure is inadvertently admitted, a pin or the like, may be used to unseat the valve 45 to release the pressure to the proper amount.

For example, if the pressure in the outlet 29 is so high that the gas above liquid 19 is greatly compressed, then only a slight change in the movement of the stem or abutment 42 will make a substantial difference in the operation of valve 26. Under these conditions we may obtain a small difference in the operation of valve 26 for a larger range of movement of stem 42 by admitting air or other gas under pressure in the space above liquid 19 whereby a given range of movement of stem 42 will now make a smaller percentage difference in the change in the gas volume than it did before. In other words, varying or adjusting the gas pressure above liquid 19 serves to adjust the ratio of the change in this gas pressure to the vertical movement of adjusting screw 42.

The lower casing head 33 is provided with a screw threaded opening 49 having a screw threaded plug 50 fitted therein. If desired, this opening 49 may serve as a clean out opening, or alternately, it may serve as the main inlet to the valve, in which case the inlet 28 would be plugged.

Fig. 5 shows a modification of the bellows of Fig. 4 wherein a dashpot 51 connects the bellows heads 20 and 21 to prevent vibration or chattering of the lower head 20 and the valve 26 operated thereby. The dash pot 51 comprises a piston element 52, screw threaded into the upper head 21 and having a piston head 53 which reciprocates in a cylinder 54 screw threaded into the lower head 20. The cylinder 54 is provided with a screw threaded cap 55 which serves as a guide for the rod of the piston 52. Also the cap 55 and the cylinder 54 are provided with vents 56 and 57 respectively in order that the fluid 19 may circulate in the cylinder 54.

Fig. 6 illustrates a further modification of the pressure regulator of Fig. 4 and wherein I employ, instead of the bellows 18, a flexible diaphragm 58 of acid or chemical resisting material such as rubber. This diaphragm 58 is provided with a corrugation 59 to increase flexibility and it is provided on its lower side with a reinforcing metal plate 60 in which the top of the stem of valve 25 is seated. In this case, the cap 61 seals the chamber 62 above the diaphragm 58, and in the chamber 62 I do not employ any fluid as in Fig. 4 but instead merely employ a desirable air or gas pressure, preferably higher than atmospheric, which is admitted to the chamber 62 through the valve controlled inlet 63. The valve inlet 63 comprises a nipple having a central port 64 controlled by a check valve 65 which is urged against its seat by spring 66 held in position by screw threaded plug 67. The nipple 63 is provided with ports 68 as shown, communicating with the chamber 62. The top of nipple 63 is provided with a screw threaded cap seal 69.

It will be apparent that the construction shown in Fig. 6 will be useful in cases where bellows 18 of Fig. 4 is not made in suitable sizes of materials other than brass and where the fluid controlled by the valve 26 is of such a nature, such as cyanide solution, as would attack this metal.

As shown in Fig. 1, the outlet 29 of pressure regulator 14 is connected by conduit 70 to the inlet 71 in the side of the tank 13. The top of tank 13 is sealed, whereby an air cushion is provided in the space 73 above the level of the liquid such as water in tank 13. The top of tank 13 is provided with a valve controlled inlet 74 which is of the same construction as that shown for the chamber 62 in Fig. 6. The tank 13 is provided with a sight glass 74' in order to be able to see the level at which the liquid stands in the tank 13. The tank 13 is provided with an oultet 17 leading to the pulsator 12. By means of the valve controlled inlet 74 I can increase (from an air pressure line not shown) or decrease (by pushing valve 75 away from its seat) the gas volume of the air cushion 73 to thereby adjust the head of water above outlet 17, to thereby adjust the head of air cushioned water acting on pulsator 12.

The tank 13 is of such diameter, viz. one foot, as to reduce agitation so that air will not be entrained in the water supplied from tank 13 to the pulsator 12. When the valve in pulsator 12 opens, the air cushion 73 serves to accelerate the water supplied to pulsator 12 from tank 13.

The pulsator 12, various forms of which are shown in Figs. 8, 9 and 10 is provided with an inlet 76 connected to tank 13 and an outlet 77 connected to hutch 10.

As shown in Fig. 8, this form of pulsator comprises two flanged casing members 78 and 79 held together by suitable means such as bolts 80. The lower casing member 78 between the inlet 76 and outlet 77 is provided with a valve 81 and a seat 82 therefor. Also the lower casing member 78 is provided with a spider having a centrally disposed guide 83 for the downwardly extending stem 84 of the valve 81. The valve 81 also has an upwardly extending stem 85, the lower portion of which is screw threaded at 86 and provided with a nut 87 to retain the valve 81 in position on the stem against a shoulder 88. The top of valve stem 85 is screw threaded into a nut or boss 89 which is formed or secured as by welding to the upper face of the lower bellows head 90. The bellows 91 also has an upper head 92 which bears against a screw threaded stem 93 mounted in a central aperture in the top wall of casing 79, similar to the adjustable abutment 42 of Fig. 4.

The lower casing member 78 is provided above the valve 81 with a spider 94 which serves as a support for the lower end of spring 95, the upper end of which bears against the lower face of bellows head 90 to urge the valve 81 towards an open position, acting against a certain predetermined pressure inside the bellows 91.

In order to restrict the air or gas space within the chamber formed by bellows 91 to a small fraction of the volume of said bellows, I provide inside of said bellows a sealed cup or chamber 96 integral with or suitably secured to the lower face of the upper rigid bellows head 92. The bottom of cup 96 is provided with a recess 97 to receive the nut 89 when the valve 81 is raised.

In order to vary the gas pressure in the space within the sealed chamber defined by the exterior of cup 96 and the interior of bellows 91, I provide a conduit 98 which opens at its lower end into the space outside of cup 96 and within bellows 91, and the upper end of which terminates in a nipple 99 serving as a valve controlled inlet whereby air or gas under pressure greater than atmospheric may be admitted inside of bellows 91 and outside of cup 96. The valve controlled inlet or nipple 99 is accessible from the exterior of casing 79 by reason of the fact that it extends through an opening in the top wall of casing 79, this opening having a screw threaded nipple 100 therein with a cap seal 101 thereon.

It will be noted that the area of the lower bellows head 90 is greater than the area of valve 81 whereby fluid pressure admitted at inlet 76 causes the valve 81 to open, thereby permitting an impulse of water to flow past the valve and through outlet 77. As soon as valve 81 opens, the differential in force between bellows head 90 and valve 81 no longer exists in sufficient amount to maintain the valve 81 open and it closes due to the excess of pressure within the bellows over the force of spring 95 and that differential fluid force. As soon as valve 81 is closed, the above mentioned force differential is again created and the valve opens again and this cycle of opening and closing causes a series of impulses of water to flow to outlet 77 at a frequency and force depending upon a number of factors.

Assuming that all operating conditions are constant and adjustments made, the effect of separately varying the pressure regulator 14, air cushion 73, and pulsator 12 will now be described. The effect of turning the stem 42 to increase the pressure within the bellows 18 and on lower bellows head 20 will correspondingly increase the level at which the pressure is regulated to be constant in the outlet 29 for the following reasons. Assuming valve 26 to be open and in a state of rest, the force of the gas pressure within the bellows 18 and acting on the lower head 20 which tends to move valve 26 away from its seat, is equal to the sum of the force of spring 31 and the force of the fluid pressure in the bellows chamber 37. Still assuming that the gas pressure within bellows 18 is higher than it was before it will be seen that a higher pressure in outlet 29 will now be required to overcome the pressure within the bellows 18 and move the valve 26 to a closed position. In other words, when the valve 26 is open and at rest, the force of the gas pressure (a) equals the sum of force (b) of the spring 30 and the force (c) of the fluid in bellows chamber 37. In order for the valve 26 to remain in an open position at rest under operating conditions with a higher gas pressure in bellows 18, that is, with a higher value of (a), it is obvious that a higher value of (c), namely, the pressure in the bellows chamber, is required in order to satisfy the above equation, the force (b) of the spring remaining substantially constant for both conditions. On the other hand, if it is desired to regulate for a lower pressure in outlet 29, the stem 42 is turned so as to decrease the gas pressure within the bellows 18. Also, the gas pressure within bellows 18 as well as the working range of this bellows and the valve controlled thereby may be adjusted by varying the air pressure admitted through nipple 44 to the space above fluid 19 as described above.

The result of increasing the operating pressure of the fluid leaving outlet 29 is to increase the head of water in tank 72 with a consequent increase in the pressure of air cushion 73 and to correspondingly increase the pressure at which water or other fluid is admitted to pulsator 12. Increasing the fluid pressure at the inlet 76 of pulsator 12 serves to increase the opening stroke of pulsator valve 81 whereby this valve in having an increased excursion takes a longer time for opening and closing, namely, the frequency is lowered.

Any increased pressure within tank 13 will increase the velocity of fluid discharged from the tank and also the velocity of fluid entering inlet 76 and also increase the pressure acting on the lower face of bellows head 90 and the upper face of valve 81. As a result of the increased pressure between these surfaces and the increased velocity of the water entering inlet 76, the differential force on the lower face of bellows head 90 and the upper face of valve 81 will be increased. The resulting increased pressure causes the bellows head 90 and all parts fastened thereto to have a longer reciprocating stroke. As a result of the above mentioned increased reciprocating stroke, the frequency of operation of this unit will be decreased.

Even though the higher pressure gives an increased acceleration of bellows head 90 and parts attached thereto, nevertheless experience has shown that an increase in the pressure at inlet 76 results in lowering the frequency of operation of valve 81.

Changing the adjustment on the pressure regulator 14 so as to regulate at a lower constant pressure will similarly result in an increase in the frequency of the impulses generated by pulsator 12.

Under constant operating conditions, an increase of pressure within tank 13 will increase the volume of water passing through the hutch valve 146 and decrease the frequency of impulses. The frequency may be increased to its previous value by increasing the pressure within bellows 91 with a net increased force of impulses. The resulting increased velocity of water through the hutch valve 146 may be regulated as desired by use of the hutch valve adjustment 143.

Under constant operating conditions, an increase in pressure within the space inclosed by bellows 91 and cup 96 will increase the frequency, reduce the stroke of valve 81 and decrease the volume of water passing through outlet 77. The rate of acceleration of the water passing through outlet 77 will be greater, but due to the time factor involved and the restricted passage below valve 81, the velocity of water passing through outlet 77 will be less than would be the case under the same pressure conditions with a longer stroke.

By these various adjustments I can regulate the frequency, the velocity of water passing the hutch valve 146 and the volume passing this valve.

It will be apparent that for each adjusted condition of any one or two of the three elements, namely, regulator 14, tank 13 and pulsator 12, there is a wide range throughout which the remaining element or elements may be regulated and adjusted whereby the frequency and force of the impulses delivered by pulsator 12 may be independently regulated and adjusted as desired.

A modified and preferred form of pulsator 12 is shown in Fig. 9 wherein the spring 95 of Fig. 8 is omitted. Also the upper valve stem 85' is secured for example by being screw threaded into the lower face of bellows head 90' whereby the upper surface of this bellows head is flat and the lower wall of cup 96' is flat making it unnecessary to employ the recess 97 of Fig. 8. Also, the lower valve casing 78' is provided with a spider 102 having a centrally disposed guide bearing 103 for the valve stem 85'.

By omitting the spring from the pulsator in Fig. 9 I have substantially increased the capacity of the pulsator for the following reasons.

It is evident that any force exerted on the lower face of bellows head 90 to raise valve 81 from its seat under operating conditions must be overcome by pressure energy within bellows 91 and outside cup 96. By eliminating spring pressure on the lower bellows head 90 this energy may be utilized in increasing the necessary pressure below head 90' and above valve 81'. Due to this increased pressure, the force of impulses leaving discharge outlet 77 are accordingly greater and for this reason the capacity of this pulsator is increased for a given pressure within bellows 91' and outside chamber 96'. In other words, if the spring is employed we must use inside of this bellows 91 a pressure which will overcome it without affecting the discharge through outlet 77.

The force of impulses discharged through outlet 77 in Fig. 9 depends on the required differential force between the lower bellows head 90 and upper face of valve 81. By eliminating spring 95 this differential or force will become greater with a resulting increased capacity of the pulsator for a given pressure within bellows 91 and outside cup 96. In other words, I can get substantially the same operation out of the pulsator shown in Fig. 9 as in Fig. 8 with a lower pressure in the bellows 91' as this pressure does not have to be built up to a point to oppose a spring pressure.

The life of the pulsator shown in Fig. 9 will be longer than the life of the pulsator in Fig. 8 under the same operating conditions, as to frequency and force of impulses delivered from the output, for the reason that the bellows 91' of the valve in Fig. 9 can be operated under a lower internal pressure than the bellows 91 of Fig. 8, bearing in mind that the life of a bellows depends on the pressure under which the bellows operates.

A valve controlled inlet 104 is provided for the pressure regulator in Fig. 9 similar to the one described for the regulator in Fig. 8, in order to adjust the pressure between the inside of bellows 91' and the outside of cup 96'.

A modified form of pressure regulator of Fig. 8 is shown in Fig. 10, a flexible diaphragm 105 being used instead of a bellows. Diaphragm 105 is of acid or chemical resisting material such as rubber for use with fluids such as cyanide solution which would attack a copper or brass bellows. Diaphragm 105 is provided with a corrugation 106 for flexibility and is clamped between an upper casing member 107 and a lower casing member 108. Member 107 is provided with a cap seal at 107' and a valve controlled inlet at 109 similar to the construction shown in Fig. 6. At opposite sides of diaphragm 105 I provide two reinforcing metal plates 110 and 111 which are clamped between a shoulder 112 on the valve stem 113 and a nut 114 screw threaded on the top of the valve stem.

Figures 2, 3:
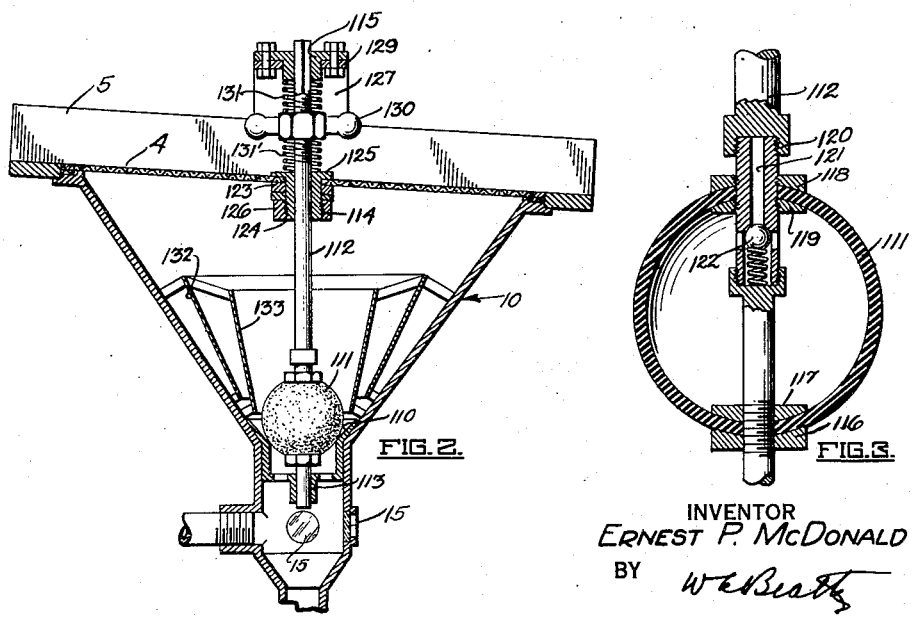
Fig. 2 is a sectional elevation of the hutch.
Fig. 3 is an enlarged sectional elevation of one type of valve which may be used in the hutch of Fig. 2.

As shown in Figs. 1, 2 and 7 the hutch 10 comprises a sluice 5 having a screen 4 in the bottom thereof. This screen covers the top of the hutch 10 which tapers to a valve seat 110. The valve 111 which is shown in detail in Fig. 3 may comprise an elastic ball of rubber or the like, mounted on a valve stem 112 which is carried at its lower end in a slide bearing 113 and also guided by a bearing 114 at the screen and at its top by a loosely fitting guide 115. The lower portion of the valve stem 112 is secured to the valve 111 by a washer 116 outside of the valve and by a washer 117 inside of the valve. The valve stem 112 is also secured to valve 111 at the top thereof by the outside washer 118 and by the inside washer 119. Means are provided for inflating ball 111 to a desired pressure and to this end the valve stem is separable at the screw threaded joint 120, the lower section of the joint having a passageway 121 therethrough which is controlled by a spring pressed check valve 122.

The bearing 114 is shown in further detail in Fig. 7 and comprises a cross member 123 which supports a bushing 124 in which the valve stem 112 slides. The bushing is provided with a flange 125, the under side of which engages the screen and this bushing is clamped in position as shown by means of a nut 126. The sluice 5 is provided with two uprights 127 and 128 which support a cross piece 129 in which the guide 115 is mounted. This guide makes a loose fit with the valve stem 112 and is provided with a non circular cross section which fits with the upper end of valve stem 112 having a corresponding shape such as square, in order to prevent it from rotating when manipulating the thumb nut 130 to regulate the tension on the valve 111. By regulating the tension on the valve 111 I can control the stroke of this valve and consequently the velocity of liquid entering the hutch 10. The thumb nut 130 is screw threaded onto an upper portion of the valve stem 112 and a spring 131 is provided between this thumb nut and the under side of bearing 115. Also a spring 131' is provided between the upper side of bushing 124 and the under side of thumb nut 130.

The hutch valve 111, and the same is true of the modification shown in Fig. 11, opens and closes with each fluid impulse acting on the valve. As the force of an impulse increases, the valve opens to admit the liquid to the hutch, thus agitating the pulp and causing the heavier concentrates to settle upon or near the valve seat. As the force of each pulse decreases, the valve 111 moves towards a closed position to decrease the velocity of the liquid therethrough while permitting some of the fluid in the hutch to leak past the valve 111 and carry with it the concentrate. By employing a reciprocating fluid pressure operated valve such as 111 in the hutch 10, I automatically seal off the chamber below the valve 111 from the hutch chamber above this valve except when impulses are admitted to the hutch chamber, above the valve, and except during the closing stroke of the valve when the concentrate is separated from the pulp at the valve.

If desired, I may employ one or more deflectors 132, 133 inside of hutch 10 and above valve 111 in order to more uniformly distribute the force of the impulses over the area of the screen 4.

In order to prevent the solids in the ore pulp, or the like, which pass over the screen 4 from settling between valve stem 112 and the bushing 124, as may be the case in Fig. 2, I prefer to use the modification illustrated in Fig. 12 wherein the valve stem 112 is loosely enclosed within a bushing 135 which has a height greater than the normal level of the pulp in the sluice 5. Bushing 135 is provided with a flange 136 above the screen and with a nut 137 below the screen. Bushing 135 is suitably secured to a cross piece 138 which extends above the level of the pulp, in sluice 5 and is suitably fastened to the sides of this sluice. A guide for the top of valve stem 112 in this case is provided by a bushing 139 having a non circular, such as a square, interior which has a working fit with the similarly shaped top of valve stem 112. Bushing 139 is carried by a top cross piece 140 supported by uprights 141 and 142 arising from and suitably secured to the sides of the sluice 5. The valve stem 112 is provided with a thumb nut 143 and with springs 144 and 145 to regulate the velocity of water passing hutch valve 146.

A preferred form of fluid operated hutch valve is shown in Fig. 11 wherein a conical shaped valve 146 having downwardly sloping sides and a re-entrant rim or face 147 is provided. Preferably this valve is hollow as shown and it cooperates with a valve seat 148 of resilient material such as rubber. The valve stem 112 at its lower end is guided by a bearing 150 formed in a spider 151 in the lower part of the hutch chamber. If desired, the valve stem below the threaded portion 152 which is threaded into valve 146 may terminate and be connected by a threaded sleeve 153 to a valve stem extension 154.

Referring to Fig. 1, the velocity of the fluid impulses delivered from pulsator 12 to the hutch 10 may to some extent be controlled by regulating the opening of valve 16 which controls the discharge from the hutch 10 of some of the water therein with the concentrate. Also, an operator may look through one of the windows 15 and observe the nature of the concentrate passing the valve and at the same time regulate the thumb nut 130 to change or regulate the operation of the hutch valve 111 in order to get the best operating conditions.

Without limiting the invention to the following figures, the following is given as an example of the pressure conditions which may be employed. The resulting force of the operating pressure within pressure tank 13, acting on the lower surface of bellows head 90, must overcome the resulting downward force acting on valve 81 and the downward force acting on the upper surface of bellows head 90. Under these conditions the liquid pressure within tank 13, which is the same as the liquid pressure delivered by pressure regulator 14, must be higher than the pressure within the space included within bellows 90 and outside displacement cup 96. Under working conditions I may give as approximate working pressures, four pounds per square inch in tank 13 and three pounds per square inch within bellows 90.

Various modifications may be made in the method and means herein disclosed without departing from the sphere of the invention.

I claim:

1. An hydraulic classifier of solids comprising the combination of a pressure regulator adapted to be connected to a water supply, a storage tank supplied by said regulator and having a closed top to air cushion the water therein, an automatic pulsator supplied by said tank and adapted to be operated at a high frequency by the flow of water therethrough, a fluid tight bellows controlling the operation of said valve, means for adjusting the pressure within said bellows, means for varying the force exerted on said valve by said bellows, a hutch associated with said valve, and an adjustable spring controlled, fluid pressure operated valve in said hutch for admitting unidirectional impulses of water from said automatic pulsator to said hutch and for permitting discharge of the concentrate.

2. An hydraulic classifier of solids comprising the combination of a hutch chamber having a top adapted to receive pulp at one side and adapted to discharge tailings at the other side, said hutch chamber converging downwardly to a valve seat, an upwardly opening fluid pressure operated valve for said seat, a concentrate chamber below said seat and in communication with said hutch chamber, means for admitting fluid impulses below said valve to operate said valve, and means for controlling the flow of concentrate from said concentrate chamber.

3. In apparatus of the character described, a hutch comprising a casing having a port adjacent its bottom for the admission of pulsating liquid and shaped to cause the discharge of concentrate through said port, a screen adjacent the top of the casing, a pulsation-responsive valve controlling said port, and a liquid actuated pulsator for delivering a liquid under regular pulsations to said chamber by way of the valved port.

4. In the apparatus defined in claim 3, yielding means tending to hold said valve in its closed position, and adjusting means for varying the resistance of said yielding means to opening movement of the valve.

5. Apparatus of the character described, comprising a hutch provided with a screen and having a pulsation-responsive valve for controlling the inflow of liquid thereto, a high frequency pressure-responsive pulsator valve connected to said hutch to supply pulsating liquid thereto, adjustable means for varying the frequency of said pulsator valve, adjustable means constituting a source of liquid under variable constant pressure for passage through said pulsator valve, and still further adjustable means for varying the resistance to opening movement of said pulsation-responsive valve.

6. An hydraulic classifier of solids comprising the combination of a hutch having a chamber with an ore pulp inlet and a tailings outlet at its upper end, a sifting screen positioned in the path of liquid flow to and from said hutch, a pulsator, a pressure regulator, means to pass liquid in series through said regulator, pulsator and hutch, means for adjusting said regulator to supply the liquid to said pulsator at a desired constant pressure, a valve in said pulsator and means within said pulsator responsive to the pressure of liquid supplied thereto for causing said valve to intermittently open and close to supply a series of substantially constant impulses to said chamber, a second valve within said chamber arranged to permit the inlet of liquid and the discharge of concentrate, and adjustable tensioning means for said second valve whereby it may be adjusted to pass liquid at a desired velocity into said chamber and through said screen.

7. An hydraulic classifier of solids comprising, in combination with means for pulsating a liquid under substantially constant head, a hutch having a chamber converging downwardly to a valve seat, a valve for said seat, means for admitting a pulsating water stream below said valve, and adjustable tensioning means yieldingly urging said valve downwardly toward said seat and so controlling said valve that the range of movement of said valve may be varied to vary the stream velocity therethrough.

8. An hydraulic classifier of solids comprising the combination of a pulsator, an inlet and an outlet therefor, said pulsator comprising a valve adapted to be operated by liquid flow therethrough for generating high frequency unidirectional liquid impulses, a hutch having an adjustable spring controlled valve for controlling the admission of said liquid impulses to said hutch, and means upon said pulsator for varying the frequency of said impulses.

ERNEST P. McDONALD.